United States Patent [19]

Kim

[11] Patent Number: 6,013,995

[45] Date of Patent: Jan. 11, 2000

[54] METHOD AND APPARATUS FOR ADAPTIVE FEEDFORWARD CONTROL WITH REDUCED NOISE DURING TRACK SEEK OPERATIONS

[75] Inventor: Gwan-Il Kim, Seongnam, Rep. of Korea

[73] Assignee: SamSung Electronics Co., Ltd., Kyungki-do, Rep. of Korea

[21] Appl. No.: 08/922,312

[22] Filed: Sep. 2, 1997

[30] Foreign Application Priority Data

Sep. 2, 1996 [KR] Rep. of Korea ................. 96-37941

[51] Int. Cl.$^7$ .................... G05B 13/00; G05B 5/01
[52] U.S. Cl. .................. 318/561; 318/606; 318/617; 364/165
[58] Field of Search .................. 364/164, 165; 318/561, 615–618, 606–608

[56] References Cited

U.S. PATENT DOCUMENTS

| | | |
|---|---|---|
| 3,662,276 | 5/1972 | Hyer . |
| 3,883,894 | 5/1975 | Johnson . |
| 3,940,594 | 2/1976 | Bleak et al. . |
| 3,961,234 | 6/1976 | Chambers et al. . |
| 4,471,278 | 9/1984 | Matouka . |
| 4,509,000 | 4/1985 | Ferguson . |
| 4,642,541 | 2/1987 | El-Sadi . |
| 4,697,127 | 9/1987 | Stich et al. . |
| 4,882,526 | 11/1989 | Lino et al. ................. 318/561 |
| 4,893,068 | 1/1990 | Evans, Jr. . |
| 4,904,912 | 2/1990 | Yamamoto ................. 318/561 |
| 5,107,193 | 4/1992 | Iwashita ................. 318/560 |
| 5,128,812 | 7/1992 | Uno . |
| 5,132,855 | 7/1992 | Waugh et al. . |
| 5,223,778 | 6/1993 | Svarovsky et al. ............ 318/610 |
| 5,235,262 | 8/1993 | Takeuchi et al. ............ 318/603 |
| 5,469,414 | 11/1995 | Okamura ................. 369/32 |
| 5,510,939 | 4/1996 | Lewis ................. 360/78.09 |
| 5,585,976 | 12/1996 | Pham ................. 360/77.04 |
| 5,587,636 | 12/1996 | Bar-Kana et al. ............ 318/561 |
| 5,680,271 | 10/1997 | Yatsu ................. 360/79.09 |

*Primary Examiner*—Brian Sircus
*Attorney, Agent, or Firm*—Robert E. Bushnell, Esq.

[57] ABSTRACT

An adaptive feedforward control system for reducing noises during a track seek operation. A servo control apparatus of the invention generates a first adaptive feedforward, in which the first adaptive feedforward adaptively follows a current command for servo-controlling the hard disk drive at a servo control decelerating interval for the track seek, and the first adaptive feedforward has a linear slope. Further, a high frequency component is removed from the first adaptive feedforward. Therefore, it may be possible to remove the current control error as well as the noises during the track seek operation.

5 Claims, 4 Drawing Sheets

METHOD AND APPARATUS FOR ADAPTIVE FEEDFORWARD CONTROL WITH REDUCED NOISE DURING TRACK SEEK OPERATIONS

CLAIM OF PRIORITY

This application makes reference to, incorporates the same herein, and claims all benefits accruing under 35 U.S.C. §119 from an application for ADAPTIVE FEEDFORWARD CONTROL METHOD FOR REDUCING NOISE DURING TRACK SEEK OPERATION earlier filed in the Korean Industrial Property Office on the 2nd day of Sep. 1996 and there duly assigned Serial No. 1996-37941, a copy of which application is annexed hereto.

BACKGROUND OF THE INVENTION

1. Field of the Invention

The present invention relates generally to a hard disk drive and, more particularly, to a method and apparatus for performing adaptive feedforward control during track seek operations with the disk drive. Even more particularly, the present invention is directed toward such a method and apparatus that perform adaptive feed forward control with reduced noise generation.

2. Description of the Related Art

The present invention uses an adaptive feedforward device to provide improved servo control of a disk drive head actuator during seek operations. It applies adaptive feedforward control during the deceleration phase of a seek maneuver to reduce the current gain needed to carry out the maneuver, thereby improving system performance by reducing current control errors.

It has been found, however, that application of feedforward current control signals specifically to the deceleration phase of a seek operation tends to induce a certain level of noise in the servo control signals generated by the servo control apparatus. This noise occurs as the apparatus shifts from acceleration to deceleration and appears as a rapid variation or oscillation in the current control commands of the servo apparatus at the shift point.

General servo control technology has followed parallel and occasionally intersecting paths for improvements in feedforward control and noise compensation, respectively. U.S. Pat. No. 3,940,594, for example, shows a process controller that eliminates mode-switching noise by the rather direct expedient of freezing the actuator command signal and then gradually mixing the target state signal through a settle circuit. Alternatively, U.S. Pat. No. 3,961,234 shows a system for industrial process control using electrical actuators that adaptively filters measurement noise in a high-gain feedback loop. Here the system avoids dithering due to noise by limiting the time allowed for control signals when the error measurement signal is small.

The disk drive servo control arts, in particular, have also confronted the general problem of noise arising in control systems. For example, U.S. Pat. No. 4,642,541 discloses a servo system that uses a filter network in track following mode to generate a substantially noise-free position error signal. The significance of this improvement does not extend far beyond its direct context, however, because it does not consider other noise processes such as mode-transition noise. This patent also does not consider the use of adaptive control, noise reduction in seek operations, or noise arising in control signals themselves.

U.S. Pat. No. 4,893,068 for a Digital Employing Switch Mode Lead/Lag Integrator to D. D. Evans, shows a sophisticated digital servo control system employing an integrator located outside the conventional feedback control loop. This configuration permits the integrator to be applied to both velocity error signals in seek-type operations and position error signals in position holding operations. The system mitigates perturbations arising from switching between velocity and position error integrator inputs (i.e., mode-switching noise) by mixing the output from the previous integrator cycle with the output from the current integrator cycle. Unfortunately, the rather specialized structure employed in the disclosed system does not easily lend itself to application in other servo control contexts. It is not clear how one would adapt the system of this patent to mitigate current oscillations arising from an adaptive control feedforward network while not effectiveness of the feedforward signal.

The disk drive control arts have explored the uses of adaptive control in some contexts, including to minimize transients arising from shifts between track seeking and track following modes. U.S. Pat. No. 4,697,127 shows an adaptive control technique that estimates the forward gain of an open loop system to compensate for variations in plant parameters. This system minimizes seek-follow transition transients by applying, during seeking, a velocity command profile selected to match the normal modes (i.e., eigenvectors) of the system in track following mode. Prospective selection of seek command profiles enables the system to blend the end of the seek operation with the beginning of the track following operation, thus preventing the generation of transient components in the system response.

The sophisticated approach taken in the '127 patent also unfortunately limits the extent to which the disclosed system can be adapted to other contexts. First, its use of forward gain estimation and accordant selection of seek command profiles necessarily depends upon a sophisticated plant model and substantial computation to achieve its desired results. The disclosed system also considers only process noise (such as might arise from resonances, unmodeled bearing drag, and so forth) and measurement noise. In particular, it does not consider the constellation of problems arising from noise induced in the control signal itself.

U.S. Pat. No. 5,128,812 provides a disk drive servo control system that eliminates high frequency components from the velocity error signal to be amplified in a feedback loop. The previously existing configuration included a low pass filter to remove undesired high frequency components of the velocity difference signal in a feedback control loop. The improvement of the patent consists in a filter with variable cutoff frequency to minimize the phase lag the filter introduces into the error signal while maintaining stability of the system.

The system of the '812 patent provides an important improvement directed toward a specific problem in servo control, but it also carries several limitations. The careful balance it observes, between reducing phase lag and preserving system stability, rather clearly acknowledges the considerable complications that are known to arise from employing low pass filter networks in servo control loops. Simple filtering appears, from this patent, to have been abandoned by the art, at least for processing servo control signals. This patent also does not consider the mitigation of transient components in the context of feedforward loops or through digital signal processing techniques.

The known approaches to eliminating noise from signals in servo control systems thus have not offered an obvious solution to the transient noise problem I have noticed in using adaptive feedforward control to reduce current control errors. Such a solution should be easily and economically implemented in the adaptive feedforward device of my previous invention and should effectively eliminate the control signal noise that arises there. It should not hinder system stability and also should not reduce the effectiveness of the control system in the way that low pass filters reduce the effectiveness of velocity feedback systems by introducing phase lags. Desirably, this noise control solution should be as simple as possible so that my adaptive feedforward control system employing this solution will be applicable in as many differing contexts as possible.

SUMMARY OF THE INVENTION

It is therefore an object of the present invention to provide an improved process and apparatus for controlling hard disk drives.

It is another object to provide, in the context of servo control systems for hard disk drives, an apparatus and method for adaptive feedforward control with reduced noise.

These and other object may achieved in the practice of the present invention provides in a first aspect a servo control apparatus utilizing adaptive feedforward control, said apparatus comprising a velocity command device adapted to receive a position indicating signal and to generate therefrom a velocity command signal; a velocity error signal generator in communication with the velocity command device and adapted to receive the velocity command signal and a velocity indicating signal and to generate therefrom a velocity error signal; a gain function device in communication with the velocity error signal generator and adapted to receive the velocity error signal and one or more plant state variable signals and to generate therefrom a current command signal, with each one of the one or more plant state variable signals representative of a value of a plant state variable of a plant undergoing servo control by the apparatus; a current control signal generator in communication with the gain function device and adapted to receive the current command signal and an adaptive feedforward signal and to generate therefrom a current control signal for control of the plant; and an adaptive feedforward device in communication with the velocity command device and the current control signal generator and adapted to receive the velocity command signal and to generate therefrom the adaptive feedforward signal, with the adaptive feedforward device including a feedforward calculator and a low pass filter and with the low pass filter adapted to substantially prevent high frequency signal components from arising in the current control signal.

The present invention also provides, in a second aspect, feedforward control method for providing an adaptive feedforward signal which reduces a search noise and a current control noise during a servo control process, the method comprising the steps of: generating a first adaptive feedforward signal adaptively following a current control signal for servo control of a plant in a deceleration phase, the first adaptive feedforward having a linear slope; removing a high frequency component from the first adaptive feedforward signal to generate a second adaptive feedforward signal; and applying the second adaptive feedforward signal to a current command signal to generate the current control signal.

According to an aspect of the present invention, a feedforward control method for providing a feedforward which reduces a search noise and a current control noise during a servo control in a hard disk drive includes the steps of: generating a first adaptive feedforward adaptively following a current command for servo-controlling the hard disk drive at a servo control decelerating interval for the track seek, the first adaptive feedforward having a linear slope; and removing a high frequency component from the first adaptive feedforward, to generate a second adaptive feedforward.

BRIEF DESCRIPTION OF THE DRAWING FIGURES

A more complete appreciation of this invention, and many of the attendant advantages thereof, will be readily apparent as the same becomes better understood by reference to the following detailed description when considered in conjunction with the accompanying drawing figures, in which like reference symbols indicate the same or similar components, wherein:

FIG. 1 provides a block diagram of the servo control apparatus for performing adaptive feedforward control in a hard disk drive as disclosed in the referenced copending application;

FIG. 2 illustrates characteristic curves of control variables associated with the apparatus of FIG. 1;

FIG. 3 provides a block diagram of a servo control apparatus incorporating adaptive feedforward control according to a preferred embodiment of the present invention; and FIG. 4 illustrates characteristic curves of control variables according to a preferred embodiment of the present invention.

DETAILED DESCRIPTION OF THE PREFERRED EMBODIMENT

The present invention is an improvement upon the applicant's invention disclosed in the copending U.S. patent application, Ser. No. 08/840,603, entitled "Adaptive Feed Forward Device for Reducing Current Control Errors" and filed Apr. 30, 1997, the disclosure of which is incorporated herein by reference. The invention of that application provides for improved servo control of a disk drive head actuator during seek operations. It uses an adaptive feedforward device during deceleration of the head to reduce current gains and thereby to reduce current control error. These features have constituted a significant advance over the previously existing servo control technology.

The referenced invention also has certain weaknesses the elimination of which would provide even greater performance improvements over previously existing systems. Its principal weakness arises precisely from its operation to provide adaptive feedforward control. In particular, the adaptive feedforward device adapts its feedforward operation to the dynamic state of the plant (for example, the actuator-head combination) undergoing servo control. The adaptation action includes applying feedforward control signals specifically when the plant is executing a deceleration maneuver in a later stage of a seek operation. These feedforward signals are subtracted from feedback control signals of the servo control apparatus, thereby reducing the current gain required for the apparatus to carry out high performance servo control.

Figure 1:
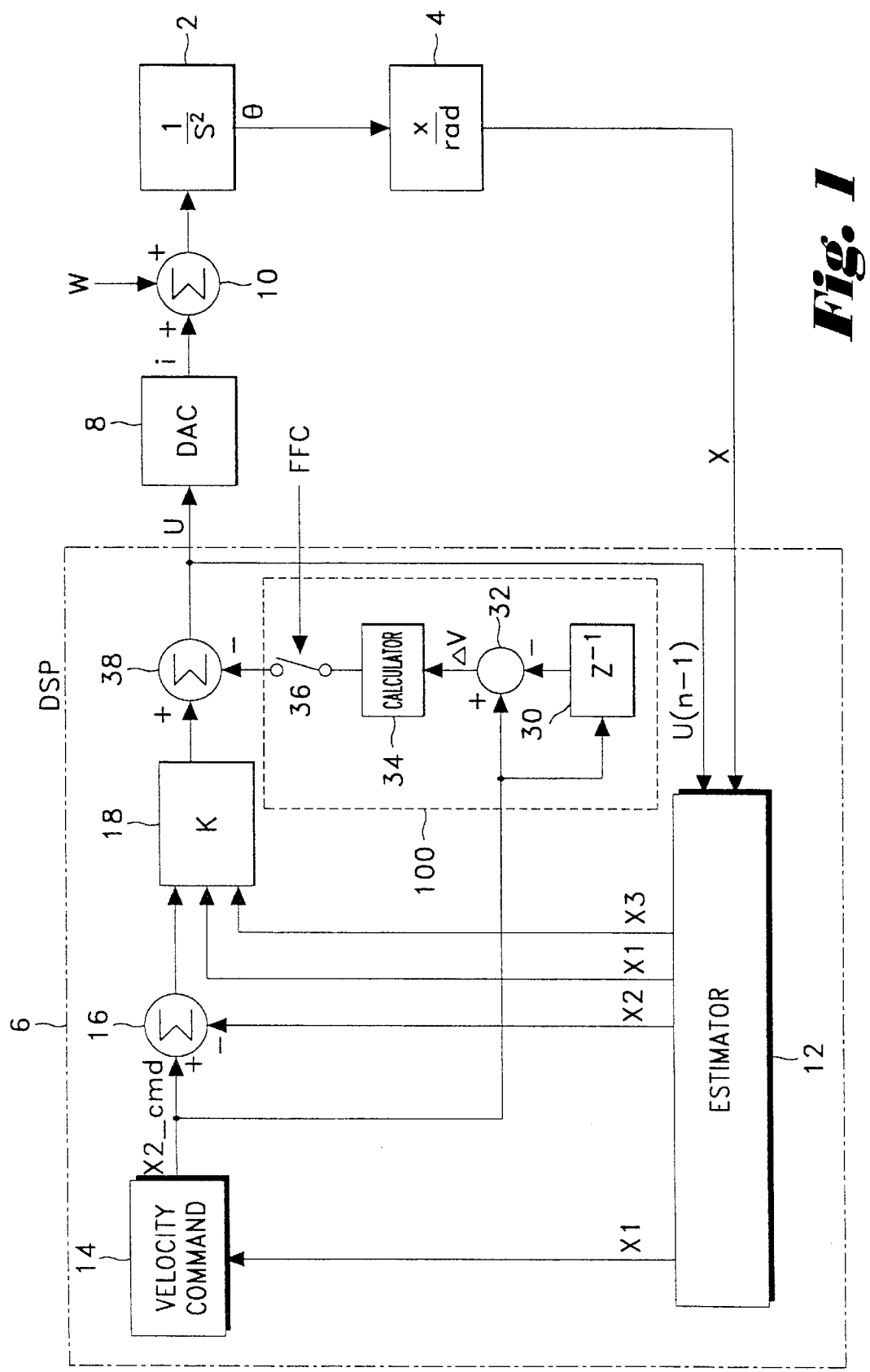

FIG. 1 is a block diagram illustrating one embodiment of the invention of the applicant's copending application referenced above. The illustrate system is a servo control apparatus for adaptive feedforward control in a hard disk drive. The exemplary servo control apparatus shown in this figure includes a plant 2 which is an object of servo control, an angle-to-position converter 4, a digital signal processor (DSP) 6 for providing servo control signals with respect to plant 2, a digital-to-analog converter (DAC) 8, and an adder 10.

Plant 2 has, for example, a transfer function $1/s^2$ representing the characteristic response of a DC motor in terms of a Laplace transform. Plant 2 generates angle information θ and provides angle-to-position converter 4 with the angle information θ. Angle-to-position converter 4 converts the angle information θ into a position information signal X and provides this signal to DSP 6.

DSP 6 includes, for example, an estimator 12, a velocity command device 14, an adder 16, a gain function device 18. DSP 6 also includes an adaptive feedforward device 100 for reducing current control error. Estimator 12 receives the position information signal X, generated by angle-to-position converter 4, and a precious current control signal U(n−1). U(n−1) is generated by adder 38, which subtracts the output of adaptive feedforward device 100 from the output of gain function device 18. Estimator 12 generates a position estimate signal X1, a velocity estimate signal X2, and a disturbance estimate signal X3 in accordance with a predetermined estimate calculating function.

Velocity command device 14 generates a velocity command signal X2_cmd in response to the position estimate signal X1. Adder 16 receives velocity command signal X2_cmd subtracts from it the velocity estimate signal X2 to generate a velocity error signal Verr. Gain function device 18 receives the velocity error signal Verr, the position estimate signal X1, and the disturbance estimate signal X3 and from them generates a current command signal for servo control of plant 2.

Adaptive feedforward device 100 operates during the servo control deceleration phase of track seek operations. It generates a deceleration command signal DCS (an adaptive feedforward) corresponding to the current command signal for the deceleration phase. The output of gain function device 18 thus need only provide a signal determined by subtracting the deceleration command signal DCS from the desired current command signal U. Therefore, gain function device 18 can undertake current control with respect to plant 2 while using a low gain coefficient. It follows, moreover, that the current command signal output from gain function device 18 will have reduced current control error by virtue of the contribution of adaptive feedforward device 100.

Adaptive feedforward device 100 comprises a delay unit 30, an adder 32, a feedforward calculator 34, and a switch 36. The output signal DCS of adaptive feedforward device 100 can be represented by the following Equation (1):

$$DCS = \frac{J \times V_{max}}{A_{rml} \times K_T \times I_{max} \times \Delta t} \times \Delta V, \quad (1)$$

in which

J: actuator inertia, $K_T$: torque coefficient, $A_{rml}$: arm length, $V_{max}$: maximum velocity of motor, $I_{max}$: maximum current supplied to motor, Δt: servo sampling interval, and ΔV: velocity command (n)−velocity command (n−1).

Figure 2:
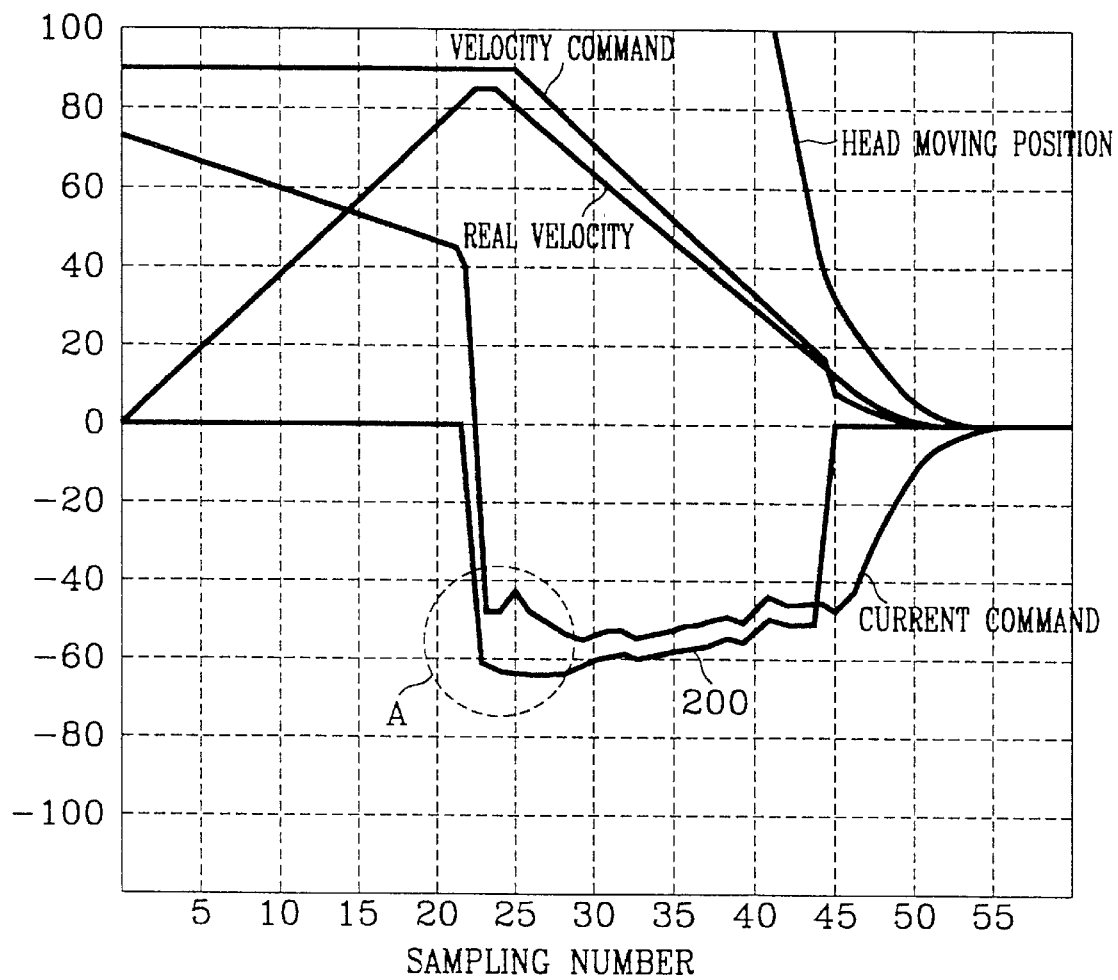

FIG. 2 illustrates characteristic curves of the control variables in terms of Equation (1). It is noted from the drawing that the adaptive feedforward curve 200, representing the time evolution of the deceleration command signal DCS, adaptively follows the current command signal curve. On the other hand, the adaptive feedforward curve 200 produces a current command curve that is not smooth over the entire deceleration interval. In particular, the current command curve exhibits a rapid variation, corresponding to rapid changes in acceleration of plant 2, in a region A.

A preferred embodiment of the present invention will be described in detail hereinbelow with reference to FIGS., 3 and 4, in which like reference numerals used throughout the specification represent like elements. Also, it should be clearly understood that many specifics such as the particular components of the disclosed device are shown only by way of example to provide a better understanding of the present invention. As will be readily understood by persons of skill in the art, the present invention may be embodied without conforming with the specific details disclosed herein. Moreover, it should be noted that a detailed description of standard components has been intentionally omitted where it is believed that such description is unnecessary to, and may obscure a full understanding of and appreciation for, the concepts of the present invention.

Figure 3:
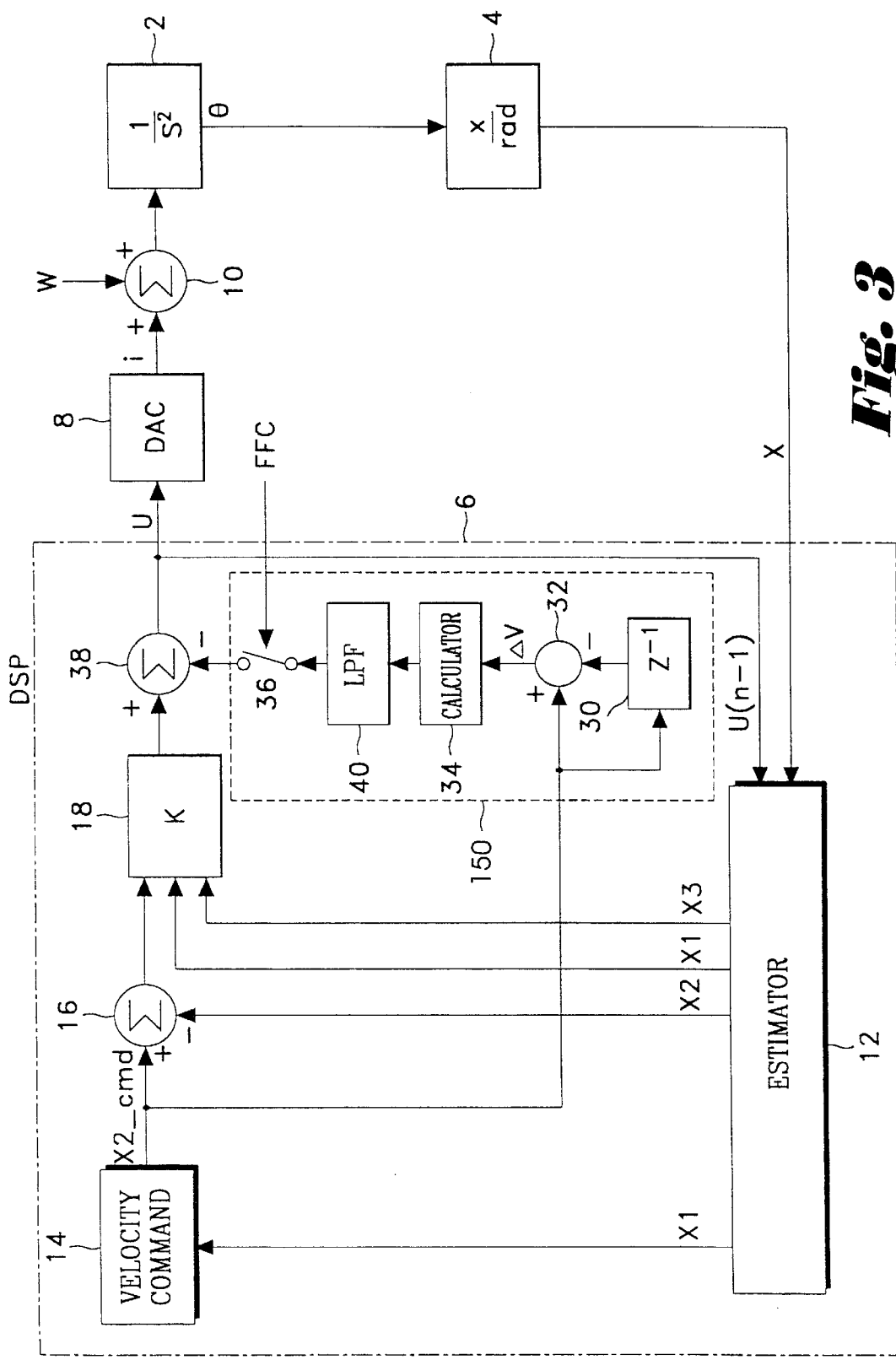

FIG. 3 provides a block diagram of a servo control apparatus according to the present invention. The apparatus of FIG. 3 is differs from the apparatus of FIG. 1 in the structure of the adaptive feedforward device 150. That is, unlike the earlier apparatus, adaptive feedforward device 150 according to the present invention further includes a low pass filter 40 interposed between feedforward calculator 34 and switch 36. Notwithstanding the clear indications to the contrary that exist in the known art, it has been found that low pass filter 40 effectively removes high frequency components from the adaptive feedforward curve 200 shown in FIG. 2, thereby smoothing it, without degrading the fidelity with which the feedforward curve follows the current command curve. This effect is made even more remarkable by the fact that the direct action of low pass filter 40 occurs before the output of adaptive feedforward device 150 is combined with the current control signal by adder 38. Thus, low pass filter cannot be said to merely remove high frequency components generated in the signal addition process of adder 38.

A first adaptive feedforward signal $FF_1$ generated by the feedforward calculator 34 of FIG. 3 can be represented by the expression of the following Equation (2):

$$FF_1 = \frac{J \times V_{max}}{A_{rml} \times K_T \times I_{max} \times \Delta t} \times \Delta V \quad (2)$$

If the first adaptive feedforward signal FF is low-pass filtered by low pass filter 40, then a high frequency component $(1-a)/(1-aZ^{-1})$ will be removed therefrom. Low pass filter 40 thus generates a second adaptive feedforward signal $FF_2$ that can be represented by the expression of the following Equation (3):

$$FF_2 = \frac{(1-\alpha)}{(1-\alpha Z^{-1})} \cdot \frac{J \times V_{max}}{A_{rml} \times K_T \times I_{max} \times \Delta t} \times \Delta V, \quad (3)$$

where α represents a low pass filter coefficient.

Figure 4:
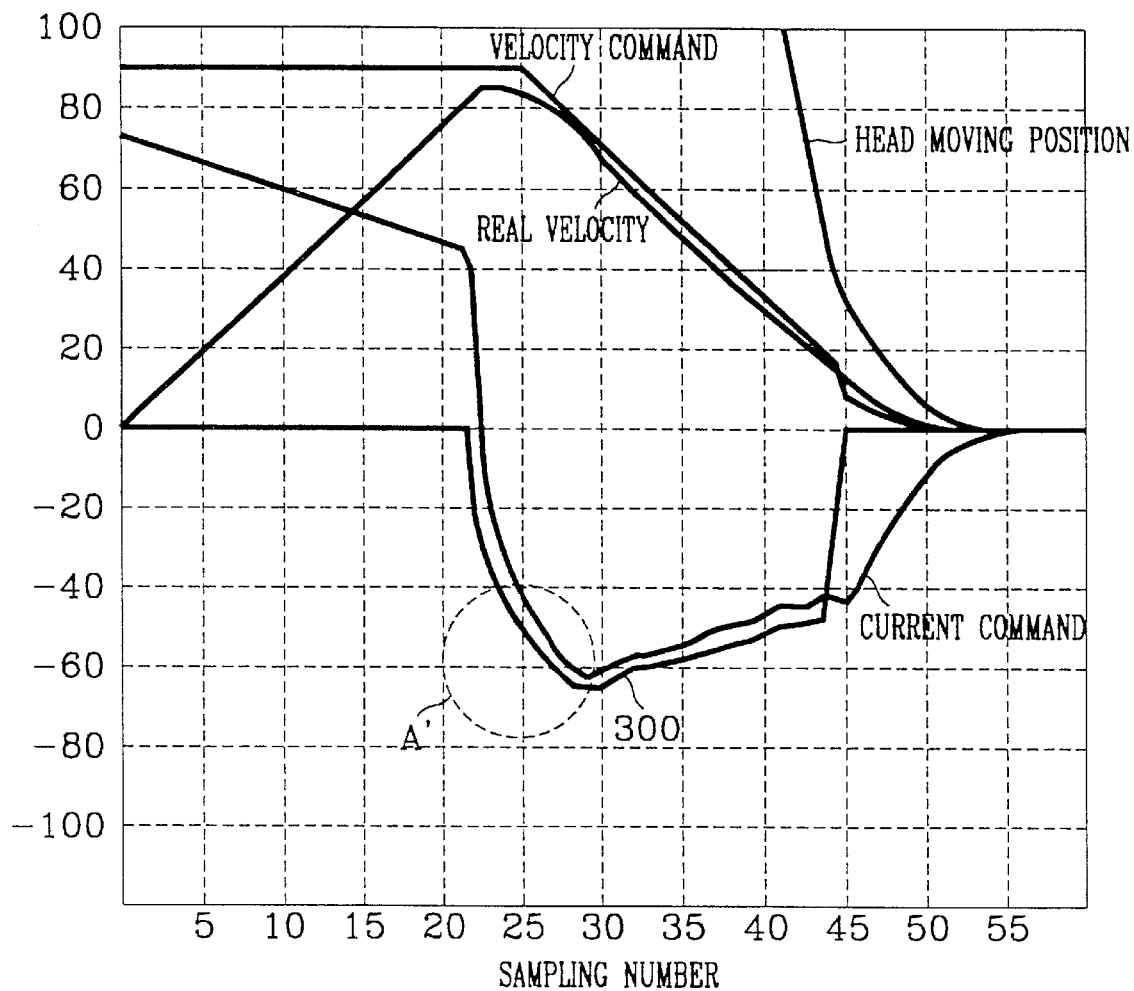

FIG. 4 illustrates a set of characteristic curves, similar to those shown in FIG. 2, wherein the reference numeral 300 indicates a curve representing the time evolution of the second adaptive feedforward signal $FF_2$. It is easily appreciated from FIG. 4 that the second adaptive feedforward curve 300 is smooth throughout the entire deceleration interval. In particular, the current command signal does not show a rapid variation from an acceleration to a deceleration in a region A' corresponding to the region A of FIG. 2. Moreover, comparison of FIG. 4 with FIG. 2 shows that the second adaptive feedforward curve 300 retains or even improves upon the fidelity with which the corresponding adaptive feedforward curve 200 follows the current command curve.

Returning to FIG. 3, the second adaptive feedforward signal FF$_2$ output from adaptive feedforward device 150 is applied to adder 38 when switch 36 is closed during the servo control deceleration phase of track seek operation. Switch 38 is closed in response to a feedforward control signal FFC. Adder 38 subtracts the second adaptive feedforward signal FF$_2$ from the current command signal output by gain function device 18, to generate current control signal U.

As shown in FIG. 4, the current control signal U according to the present invention is smooth at the track seek decelerating interval, which thereby reduces the noise generated in the hard disk drive. As described in the foregoing, a feedforward control system according to the present invention is adaptive to the current control signal. Further, high frequency components are removed by adaptive feedforward device 150. In accordance with the present invention, therefore, it is possible to remove adaptive feedforward noise as well as the current control error during the track seek operation.

Although a preferred embodiment of the present invention has been described in detail hereinabove, it should be clearly understood that many variations on and modifications of the basic inventive concepts herein taught, which may appear to those skilled in the art ,will still fall within the spirit and scope of the present invention as defined in the appended claims.

What is claimed is:

1. A servo control apparatus utilizing adaptive feedforward control, said apparatus comprising:

a velocity command device adapted to receive a position indicating signal and to generate therefrom a velocity command signal;

a velocity error signal generator in communication with said velocity command device and adapted to receive said velocity command signal and a velocity indicating signal and to generate therefrom a velocity error signal;

a gain function device in communication with said velocity error signal generator and adapted to receive said velocity error signal and one or more plant state variable signals and to generate therefrom a current command signal, with each one of said one or more plant state variable signals representative of a value of a plant state variable of a plant undergoing servo control by said apparatus;

a current control signal generator in communication with said gain function device and adapted to receive said current command signal and an adaptive feedforward signal and to generate therefrom a current control signal for control of said plant;

an adaptive feedforward device in communication with said velocity command device and said current control signal generator and adapted to receive said velocity command signal and to generate therefrom said adaptive feedforward signal, with said adaptive feedforward device including a feedforward calculator and a low pass filter and with said low pass filter adapted to substantially prevent high frequency signal components from arising in said current control signal; and said low pass filter providing said adaptive feedforward signal having the following characteristic:

$$\frac{(1-\alpha)}{(1-\alpha Z^{-1})} \cdot \frac{J \times V_{max}}{A_{rml} \times K_T \times I_{max} \times \Delta t} \times \Delta V$$

where α: low pass filter coefficient
J: actuator inertia,
K$_T$: torque coefficient,
A$_{rml}$: arm length,
V$_{max}$: maximum velocity of a motor
I$_{max}$: maximum current supplied to a motor,
Δt: servo sampling interval, and
ΔV: velocity command (n)–velocity command (n−1).

2. A feedforward control method for providing an adaptive feedforward signal which reduces a search noise and a current control noise during a servo control process, said method comprising the steps of:

generating a first adaptive feedforward signal adaptively following a current control signal for servo control of a plant in a deceleration phase, said first adaptive feedforward having a linear slope;

removing a high frequency component from said first adaptive feedforward signal to generate a second adaptive feedforward signal having the characteristic:

$$\frac{(1-\alpha)}{(1-\alpha Z^{-1})} \cdot \frac{J \times V_{max}}{A_{rml} \times K_T \times I_{max} \times \Delta t} \times \Delta V$$

where α: low pass filter coefficient
J: actuator inertia,
K$_T$: torque coefficient,
A$_{rml}$: arm length,
V$_{max}$: maximum velocity of a motor
I$_{max}$: maximum current supplied to a motor,
Δt: servo sampling interval, and
ΔV: velocity command (n)–velocity command (n−1); and applying said second adaptive feedforward signal to a current command signal to generate said current control signal.

3. The servo control apparatus utilizing adaptive feedforward control of claim 1, wherein said feedforward calculator generates a signal having the characteristic:

$$\frac{J \times V_{max}}{A_{rml} \times K_T \times I_{max} \times \Delta t} \times \Delta V$$

where
J: actuator inertia,
K$_T$: torque coefficient,
A$_{rml}$: arm length,
V$_{max}$: maximum velocity of a motor
I$_{max}$: maximum current supplied to a motor,
Δt: servo sampling interval, and
ΔV: velocity command (n)–velocity command (n−1).

4. A feedforward control method for providing a feedforward which reduces a search noise and a current control noise during a servo control in a hard disk drive, comprising the steps of:

generating a first adaptive feedforward adaptively following a current command for servo-controlling the hard disk drive at a servo control decelerating interval for the track seek, said first adaptive feedforward having a linear slope; and removing a high frequency component from said first adaptive feedforward, to generate a second adaptive feedforward having the characteristic:

$$\frac{(1-\alpha)}{(1-\alpha Z^{-1})} \cdot \frac{J \times V_{max}}{A_{rml} \times K_T \times I_{max} \times \Delta t} \times \Delta V$$

where α: low pass filter coefficient
J: actuator inertia
$K_T$: torque coefficient,
$A_{rml}$: arm length,
$V_{max}$: maximum velocity of a motor
$I_{max}$: maximum current supplied to a motor,
Δt: servo sampling interval, and
ΔV: velocity command (n)–velocity command (n−1).

5. A feedforward control method according to claim 4, wherein said feedforward is represented by, $$\frac{J \times V_{max}}{A_{rml} \times K_T \times I_{max} \times \Delta t} \times \Delta V$$

where

J: actuator inertia,
$K_T$: torque coefficient,
$A_{rml}$: arm length,
$V_{max}$: maximum velocity of a motor
$I_{max}$: maximum current supplied to a motor,
Δt: servo sampling interval, and
ΔV: velocity command (n)–velocity command (n−1).

* * * * *